(No Model.)
H. G. CADY.
WEDGE FOR VEHICLE WHEELS.
No. 323,910. Patented Aug. 11, 1885.
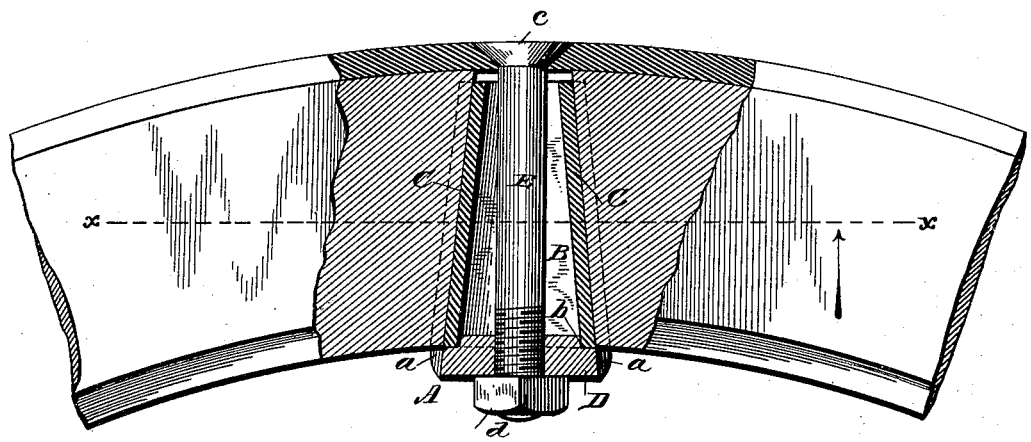
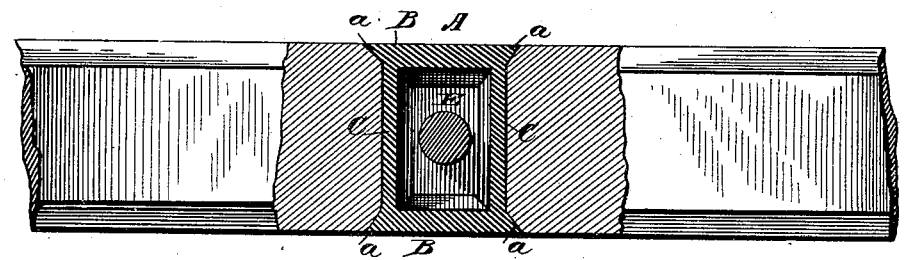

United States Patent Office.

HENRY G. CADY, OF PINE BLUFF, ARKANSAS.

WEDGE FOR VEHICLE-WHEELS.

SPECIFICATION forming part of Letters Patent No. 323,910, dated August 11, 1885.

Application filed May 29, 1885. (No model.)

*To all whom it may concern:*

Be it known that I, HENRY G. CADY, a citizen of the United States, residing at Pine Bluff, in the county of Jefferson and State of Arkansas, have invented certain new and useful Improvements in Wedges for Vehicle-Wheels; and I do hereby declare the following to be a full, clear, and exact description of the invention, such as will enable others skilled in the art to which it appertains to make and use the same.

My invention relates to certain improvements in wheels for vehicles, and has for its object to provide a hollow wedge suitable for use in compensating for changes in the felly.

The further object of my invention is to provide a compensating-wedge, which, owing to certain peculiarities in its form of construction, hereinafter specified, will remedy the defects existing in wedges heretofore used.

A serious objection to the solid wedge with plain faces heretofore used has been that no means have been provided for securing the contiguous ends of the felly-sections in place, so as to cause the same to bear against the faces of the wedge. The ends of the felly have been liable to warp or spring out of place, and no protection being afforded to the outer edges of the exposed ends of the felly-sections, they have been liable to split and break. The wedge which I have constructed will remedy all of these defects, and, in addition, will possess the advantages of being lighter and requiring the use of less metal in its construction. I accomplish these objects in the manner hereinafter specified, reference being had to the accompanying drawings, and letters of reference marked thereon, which form a part of this specification.

Like letters refer to similar parts throughout the several views.

Figure 1 is a view of a portion of a wheel, with my improved wedge shown partly in section. Fig. 2 is a horizontal section on the line *x x* of Fig. 1.

A designates a hollow wedge, of iron or other metal, made at a single casting. The sides B B of the wedge are extended beyond the faces C C, so as to form the beveled flanges or corners *a a*, extending along either side of the faces of the wedge. The cap or plate D, made to conform to the size and shape of the larger end of the wedge, is perforated at its center for the passage of a bolt. Upon the under side of the plate D the lug or shoulder *b*, adapted to fit into the hollow interior of the wedge, is formed. The bolt E has at one end a beveled head, *c*, and its other end is threaded to accommodate a nut, *d*. The felly of the wheel may be made up of any desired number of sections, the ends of each section having their outer edges beveled so as to conform to the beveled flanges *a a* upon the outer edges of the wedge-faces. The compensating-wedge is inserted between the contiguous ends of the sections. The bolt E is passed through the band or tire of the wheel and extended downward through the hollow interior of the wedge, and the plate D is passed over the screw-threaded end of the bolt and fitted down upon the end of the wedge. The projecting end of the bolt is furnished with the nut *d*. It will be at once seen that when the nut *d* has been screwed down to impingement with the plate that any further manipulation of it in the same direction will operate to draw the wedge A securely into place between the contiguous ends of the felly-sections, thus forcing the same apart, tightening the tire of the wheel, and restoring the parts to a tense and perfect condition. If, upon the other hand, the wheel has become greatly swollen by an excess of moisture, and there is danger that the wheel will be thrown out of shape, the nut *d* may be unscrewed and the wedge relieved, thus permitting the contiguous ends of the felly-sections to approach each other. The wheel may thus be kept in perfect condition with the expenditure of very little time or labor.

The beveled flanges upon the edges of the faces of the wedge will serve to securely retain the contiguous ends of the felly in place and protect the same from injury.

I am aware that solid wedges, both with plain faces and also with V-shaped depressions to fit the ends of the fellies, have been used, and I make no claim to wedges of either of these forms of construction as forming a part of my invention.

Having thus described my invention and set forth its merits, what I claim as new is—

1. A hollow metallic felly-wedge having beveled flanges extending along the outer edges of its inclined faces, adapted to lap over the outer edges of the contiguous ends of the felly-sections, and having its larger end provided with a cap, substantially as described.

2. The within-described hollow felly-wedge having beveled flanges extending along the outer edges of its inclined faces, adapted to lap over the outer edges of the contiguous ends of the felly-sections, and having its larger end provided with a cap having a shoulder upon its under side adapted to fit within the hollow interior of the wedge, substantially as and for the purpose specified.

In testimony whereof I affix my signature in presence of two witnesses.

HENRY G. CADY.

Witnesses:
FRANK SILVERMAN,
J. W. PARSE.